(12) United States Patent  (10) Patent No.: US 7,068,900 B2
Croteau et al.  (45) Date of Patent: Jun. 27, 2006

(54) MULTI-CLAD DOPED OPTICAL FIBER

(76) Inventors: André Croteau, 1301 Rousseau Route, Saint-Agapit, Québec (CA) G0S 1Z0; Yves Taillon, 104, Saint-Denys-Garneau, Saint-Augustin-de-Desmaures, Québec (CA) G3A 2N3; Jocelyn Lauzon, 426 Bishop Street, Beaconsfield, Québec (CA) H9W 1V6

( * ) Notice: Subject to any disclaimer, the term of this patent is extended or adjusted under 35 U.S.C. 154(b) by 0 days.

(21) Appl. No.: 11/088,946

(22) Filed: Mar. 25, 2005

(65) Prior Publication Data

US 2005/0191017 A1   Sep. 1, 2005

Related U.S. Application Data

(63) Continuation-in-part of application No. 10/241,239, filed on Sep. 11, 2002, which is a continuation of application No. 09/593,272, filed on Jun. 13, 2000, now abandoned.

(30) Foreign Application Priority Data

Dec. 24, 1999  (CA) .................................... 2293132

(51) Int. Cl.
  *G02B 6/02*  (2006.01)
  *G02B 6/22*  (2006.01)
(52) U.S. Cl. .................... 385/126; 385/127; 385/128
(58) Field of Classification Search .................... None
  See application file for complete search history.

(56) References Cited

U.S. PATENT DOCUMENTS

| 4,815,079 A | 3/1989 | Snitzer et al. |
| 5,553,163 A | 9/1996 | Nivelle |
| 5,659,644 A | 8/1997 | DiGiovanni et al. |

(Continued)

FOREIGN PATENT DOCUMENTS

EP  0 802 592 A2  10/1997

(Continued)

OTHER PUBLICATIONS

Paschotta, R. et al., *Ytterbium-doped fiber amplifiers*, IEEE J. of Quantum Electron, vol. 33, No 7, pp. 1049-1056, Jul. 1997.

(Continued)

*Primary Examiner*—Brian Healy
*Assistant Examiner*—Kevin S. Wood
(74) *Attorney, Agent, or Firm*—Ogilvy Renault, LLP; Sébastien Clark

(57) ABSTRACT

The invention provides a multi-clad fiber, with three claddings or more, where at least one intermediate cladding is inserted between an inner core and an outer core of the multi-clad fiber, for enlarging the cross-section of the fiber core or for increasing the dopant density in the core. The invention also provides an intermediate cladding having a multi-layer structure to better confine the pump power in a suitable pumping region of the fiber.

14 Claims, 2 Drawing Sheets

U.S. PATENT DOCUMENTS

| | | | |
|---|---|---|---|
| 5,949,941 A | 9/1999 | DiGiovanni | |
| 5,966,491 A | 10/1999 | DiGiovanni | |
| 6,192,713 B1 | 2/2001 | Zhang et al. | |
| 6,275,632 B1 | 8/2001 | Waarts et al. | |
| 6,483,974 B1* | 11/2002 | Waarts | 385/123 |
| 6,687,445 B1* | 2/2004 | Carter et al. | 385/127 |
| 6,701,044 B1* | 3/2004 | Arbore et al. | 385/37 |
| 6,941,053 B1* | 9/2005 | Lauzon et al. | 385/126 |
| 2002/0172486 A1* | 11/2002 | Fermann | 385/128 |
| 2004/0086245 A1* | 5/2004 | Farroni et al. | 385/123 |
| 2004/0156606 A1* | 8/2004 | Po | 385/123 |

FOREIGN PATENT DOCUMENTS

| | | |
|---|---|---|
| WO | WO 95 10868 | 4/1995 |

OTHER PUBLICATIONS

Zellmer H. et al., *Fiber lasers—compact laser lightt sources for the near infrared spectral range*, Laser und Optoelektronik, vol. 29, No. 4, pp. 53-59, Aug. 1997.

Vienne, G. G. et al., *Fabrication and characterization of $Yb^{3+}$: $ER^{3+}$ phosphosilicate fiber for lasers*, J. of Lightwave Technol., vol. 16, No. 11, pp. 1990-2001, Nov. 1998.

Goldberg L. et al., *High-efficiency side-coupling of light into double-cladding fibers using imbedded V-grooves*, OFC'96 technical Digest, p. 91, 1996.

Span-Deck Inc. V. Fab-Con, Inc. (CA 8, 1982) 215 USPQ 835.

* cited by examiner

MULTI-CLAD DOPED OPTICAL FIBER

RELATED APPLICATIONS

This application is a continuation-in-part of pending U.S. patent application Ser. No. 10/241,239 filed Sep. 11, 2002, which is a continuation of U.S. patent application Ser. No. 09/593,272 filed Jun. 13, 2000, now abandoned, all of which are hereby incorporated by reference.

FIELD OF THE INVENTION

The present invention relates to the field of optical fibers and, more particularly, to high output power fiber amplifiers or lasers.

BACKGROUND OF THE ART

There is a demand to increase the output power of fiber amplifiers/lasers. This demand is motivated by DWDM (Dense Wavelength Division Multiplexing) optical communication where multiple data channels have to be amplified simultaneously sharing the available amplifier output power with one another. Another growing application is OISL (Optical Inter-Satellite Links), where a diffraction-limited beam has to be emitted in free-space and received thousands of kilometers away. In this last case, the propagation distances prescribe high-power lasers, and the diffraction-limited quality of the optical beam prescribes using singlemode, low numerical aperture (NA), optical fiber amplifiers. The NA is calculated as follows:

$$NA = [n_{core}^2 - n_{cladding}^2]^{1/2}$$

where n represents the respective refractive indexes of the materials.

For similar reasons, LIDAR (Light Detection and Ranging) applications also demand high-power lasers, and for some particular applications, high-power fiber lasers.

The power output of fiber lasers/amplifiers is directly related to the absorbed pump power in the amplifier fiber (rare-earth doped) section, and thus it is related to the amount of pump-power that can be coupled into the same fiber. Preferably, the amplified signal is laterally singlemode in order to have stable amplification and diffraction-limited output with high output power. Thus, in that case, the amplification (doped) region should be confined to a singlemode core. For optical amplification to occur, the pump must overlap with the signal in this doped core. Coupling a pump signal into a core means using a small area laser diode. In fact, the diode active area must be smaller than the diameter of the core to allow efficient coupling. Limiting the pump diode active area limits its output power proportionally, which in turn limits the output power of the fiber laser/amplifier. The obvious way to get around this limitation is to use a multiple-clad rare-earth doped fiber. The high-power, broad area (or even diode arrays or matrix) pump diode signal would be coupled to a larger multimode region inside which the rare-earth doped core would be present (see U.S. Pat. No. 4,815,079 issued on Mar. 21, 1989 to Snitzer et al., and U.S. Pat. No. 5,533,163 issued on Jul. 2, 1996 to Muendel).

The challenge remains to optimize the efficiency of the amplifier fiber. To do so, the overlap of the doped core and the multimode pump power must be as high as possible. This allows to have a lower bleaching power threshold (less pump power wasted) and to be able to use a shorter length of rare-earth doped fiber: lower cost, lower volume, lower background loss, higher nonlinear effect threshold. The doped core must also have very high pump absorption per length unit in order to obtain the same benefits. To do so, the rare-earth doped core must be highly doped and have as large a diameter as possible (R. Paschotta et al., "Ytterbium-doped fiber amplifiers", IEEE J. of Quantum Electron., vol. 33, no. 7, pp. 1049–1056, July 1997).

The geometry of the fiber must also be chosen so that the different pump power modes are mixed to eventually overlap with the rare-earth doped inner core. That can be done by having a polygon-shaped pump guiding region (see H. Zellmer et al., "Fiber lasers—compact laser light sources for the near infrared spectral range", Laser und Optoelektronik, vol. 29, no. 4, pp. 53–59, August 1997, and aforementioned U.S. Pat. No. 4,815,079 and No. 5,533,163). The overlap between the rare-earth doped core and the different pump power modes can also be helped by using an off-center core (see aforementioned H. Zellmer et al., "Fiber lasers—compact laser light sources for the near infrared spectral range" and U.S. Pat. No. 4,815,079).

Also known in the art are: (1) G. G. Vienne et al., "Fabrication and characterization of $Yb^{3+}$:$Er^{3+}$ phosphosilicate fiber for lasers", J. of Lightwave Technol., vol. 16, no 11, pp. 1990–2001, November 1998; (2) L. Goldberg et al., "High-efficiency side-coupling of light into double-cladding fibers using imbedded V-grooves", OFC'96 technical Digest, p. 91, 1996; (3) V. P. Gapontsev et al.'s PCT Publication No. WO95/10868; published on Apr. 20, 1995 in the name of Italtel Societa Italiana Telecomunicazioni S.P.A.; (4) H. Bruesselbagh et al., European Patent Publication No. EP-0 802 592-A2 published on Oct. 22, 1997 in the name of He Holdings, Inc. dba Hughes Electronics; and (5) U.S. Pat. No. 5,659,644 issued on Aug. 19, 1997 to DiGiovanni et al.

SUMMARY OF THE INVENTION

It is therefore an aim of the present invention to provide an improved rare-earth doped optical fiber for high power amplifiers/lasers.

It is also an aim of the present invention to provide such a rare-earth doped optical fiber which has a multi-clad configuration.

Therefore, in accordance with the present invention, there is provided a triple-clad fiber comprising an intermediate cladding inserted between an inner core and an outer core of the triple-clad fiber, in order to increase the range of possible characteristics of the core, such as, for example, enlarging the cross-section of the fiber core or increasing the dopant density in the core. More generally, the invention provides a multi-clad fiber, with three claddings or more, where at least one intermediate cladding is inserted between an inner core and an outer core of the multi-clad fiber, for enlarging the cross-section of the fiber core or for increasing the dopant density in the core. The invention also provides an intermediate cladding having a multi-layer structure to better confine the pump power in a suitable pumping region of the fiber. The multi-clad fibers may comprise any kind of optical fiber cores: single-mode, slightly multi-mode or multi-mode.

Therefore, in accordance with the present invention, there is provided a triple-clad optical fiber for high power cladding-pumped fiber amplifiers and lasers, the triple-clad fiber comprising the following elements:

a core doped to provide an amplification region;

an inner cladding disposed around the core;

an intermediate cladding disposed around the inner cladding and larger than the inner cladding for guiding pump power; and an outer cladding disposed around the intermediate cladding, the inner cladding having a refractive index lower than a refractive index of the core and higher than a refractive index of the intermediate cladding allowing for a low numerical aperture of the core, and the outer cladding having a refractive index lower than the refractive index of the intermediate cladding allowing the pump power to be confined inside a volume limited by the outer cladding.

In accordance with the present invention, there is also provided a multi-clad optical fiber, the fiber comprising:

a core doped to provide an amplification region;

an inner cladding disposed around the core;

an intermediate multi-layer cladding structure having at least two layers, disposed around the inner cladding, for distributing a pump power between the layers, the inner cladding and the core, wherein the multi-layer structure comprises at least an inner layer, disposed directly around the inner cladding and an outer layer disposed at an outer boundary of the structure; and an outer cladding disposed around the outer layer of the intermediate multi-layer cladding structure;

the inner cladding having a refractive index lower than a refractive index of the core and higher than a refractive index of the inner layer of the intermediate cladding structure, allowing for a low numerical aperture of the core, and the outer cladding having a refractive index lower than a refractive index of the outer layer of the intermediate multi-layer cladding structure, allowing the pump power to be confined inside a volume limited by the outer cladding.

Advantageously, the inner layer of the intermediate multi-layer cladding structure has a refractive index higher than the refractive index of the outer layer of the intermediate multi-layer cladding structure, whereby an important portion of the pump power is confined inside a volume limited by the outer layer.

Advantageously, the intermediate cladding structure comprises only the inner and outer layers, to provide a quadruple-clad fiber.

BRIEF DESCRIPTION OF THE DRAWINGS

In order that the invention may be readily understood, embodiments of the invention are illustrated by way of example in the accompanying drawings.

Figure 1:
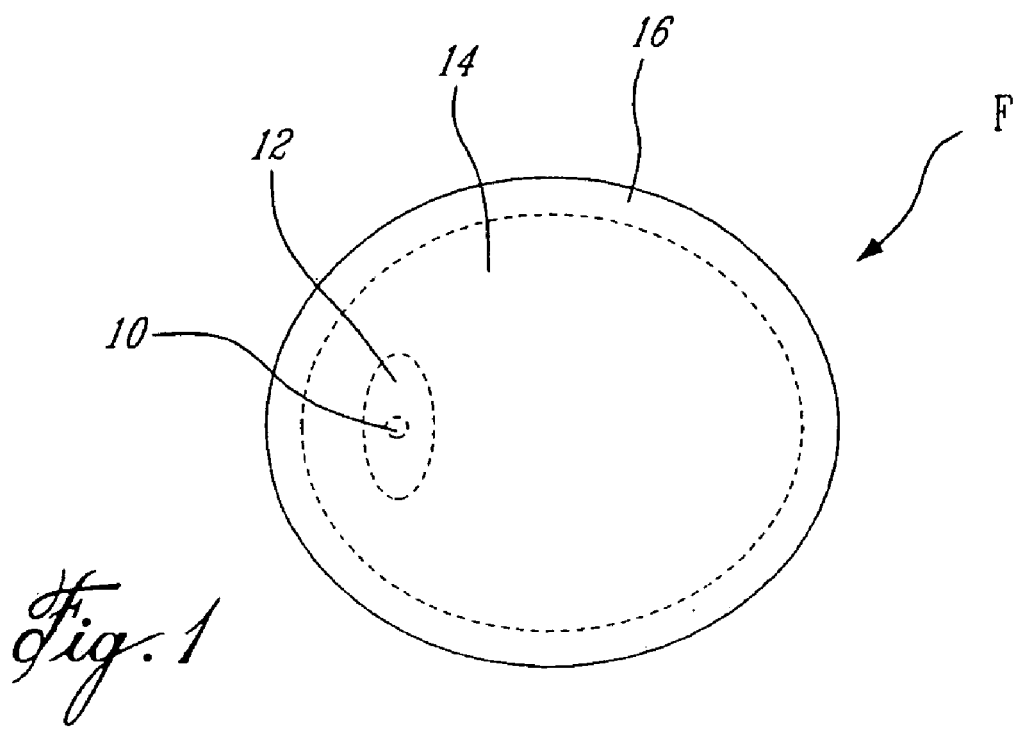
FIG. 1 is a schematic cross-sectional representation of a triple-clad rare-earth doped fiber in accordance with one embodiment of the present invention.

Further details of the invention and its advantages will be apparent from the detailed description included below.

DETAILED DESCRIPTION OF THE PREFERRED EMBODIMENTS

In the following description of the embodiments, reference to the accompanying drawings are by way of illustration of an example by which the invention may be practiced. It will be understood that other embodiments may be made without departing from the scope of the invention disclosed.

A first embodiment of the present invention consists in a rare-earth doped optical fiber F which has a triple-clad geometry. More particularly, the optical fiber F comprises an inner core 10 and, inward out, a first inner cladding 12, a second intermediate cladding 14 and a third outer cladding 16. The core 10 represents the waveguide section of higher refractive index through which the signal is transmitted and amplified. In this embodiment, the core 10 is a singlemode core and is doped with rare-earth elements useful for the transfer of energy between the pump and signal. In alternative embodiments, the core 10 can be slightly multi-mode or multi-mode. The first cladding 12 of the core 10 has a fairly high refractive index level in order to limit the rare-earth doped core numerical aperture (NA) which is evaluated as follows:

$$NA = [n_{core}^2 - n_{cladding}^2]^{1/2}$$

where n represents the refractive indexes of the materials. A low NA allows the use of a larger core while keeping the singlemode property. This also allows to control the divergence of the amplified signal at the output of the fiber F. This first cladding 12 is within the second, larger cladding 14, made of glass, that is used to guide multimode, high-power pump. In order for the second cladding 14 to guide the pump power properly, the third cladding 16 had to be added to the geometry of the present fiber F. This third cladding 16 can be made of glass or of a low-index polymer material. The pump power is then absorbed in the inner rare-earth doped core 10 and converted into a useful signal.

The first cladding 12 helps the amplifier fiber efficiency since it allows a large rare-earth doped inner core 10 to be made. Indeed, in order to favor the pump absorption in a multiple cladding fiber, the inner core must be as large as possible to maximize the overlap with the multimode pump section, and it should also have very high absorption. To increase useful power conversion absorption of the pump, the concentration of rare-earth dopants must be increased. However, by increasing the concentration of rare earth dopants, the refractive index of the core increases proportionally. This means that the NA of the inner core increases and thus a smaller inner core must be used in order to maintain the singlemode property of the inner core.

The only way around this is to increase the first cladding refractive index in order to maintain a lower NA while having a high rare-earth doped concentration n the inner core. With the current fiber fabrication techniques, it is not possible to maintain a large cladding refractive index through all the optical fiber cross-section. Thus the first cladding 12 of the present optical fiber F acts as an intermediate level between the inner core 10 and the multimode pump guiding section 14. This intermediate level also has the advantage of providing more possibilities in designing the multiple cladding optical fiber geometry. It can also be useful in order to trap some of the pump signal into a smaller section in order to accelerate the absorption of the pump power.

It is noted that FIG. 1 does not show the fiber coating which is added outside the useful fiber cross-section of the triple-clad rare-earth doped optical fiber F, i.e. around the third cladding 16.

Figure 2:
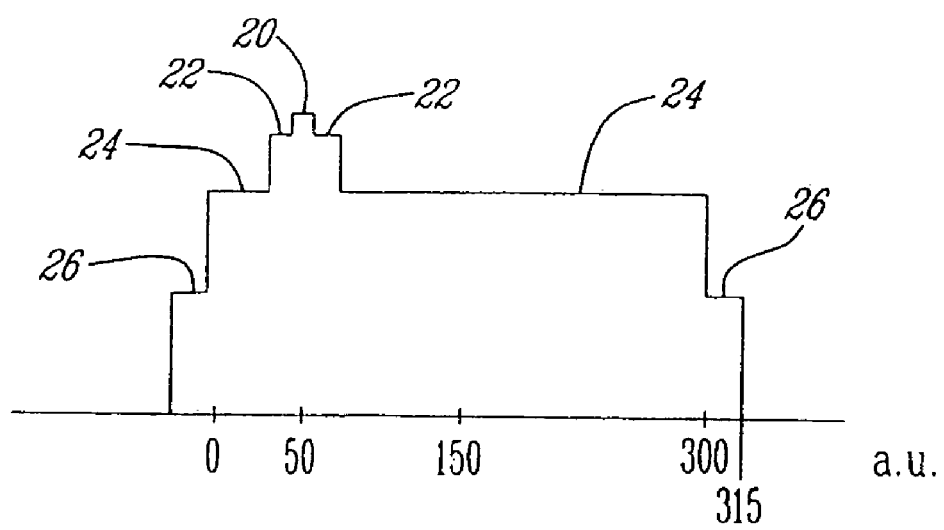
FIG. 2 is a schematic graphic representation of the refractive index profile of the various sections of the fiber of FIG. 1.

In FIG. 2, a graphic is presented to show the relative refractive indexes of the various sections of the fiber F of FIG. 1. More particularly, the refractive indexes of the core 10 and the first, second and third claddings 12, 14 and 16, respectively, are respectively indicated at 20, 22, 24 and 26. On the graphic representation of FIG. 2, the ordinate (i.e. the y-axis) corresponds to relative refractive indexes of the different sections of the optical fiber F, whereas the abscissa (i.e. the x-axis) corresponds to an arbitrary value relating to the diameter of the optical fiber F, that is the fiber cross-section or diameter, which is measured in a unit of length, generally in micrometers.

The optical fiber F of FIG. 1 represents just one example of the possible different fiber geometries that the present invention allows. For another possible geometry, the rare-earth doped core 10 can be centered in order to simplify fusion splicing to another fiber and the first cladding 12 can be asymmetrically positioned in relation to the fiber center in order to provide pump power mode mixing. For a yet another possible geometry, the second cladding 14 may have a convex polygon cross-section. Any of the triple-clad rare-earth doped fiber sections, i.e. the core 10 or the three different claddings 12, 14 and 16, can be made to be polarization-maintaining using any of the known techniques to do so: elliptical core, elliptical clad, panda or bow-tie configurations, D-shaped sections, etc. These few geometry examples do not limit the scope of the invention which covers any triple-clad rare-earth doped optical fiber geometry.

Thus, the present optical fiber F has a triple-clad fiber configuration that allows multimode high-power pumping of a singlemode signal to be amplified while optimizing the overlap between the pump and signal, thus optimizing the power conversion efficiency between the pump and signal, in order to make efficient optical amplifiers or lasers.

As it will be readily apparent for someone skilled in the art, the triple-clad fiber geometry may be equally applied to an optical fiber that does not have a core with single-mode properties. Thus the idea of inserting an intermediate cladding between an inner core and an outer core in order to increase the range of possible characteristics of the core, such as, for example, enlarging the cross-section of the fiber core or increasing the dopant density in the core, is applicable to any kind of optical fiber cores: single-mode, slightly multi-mode or multi-mode.

The principles described above according to which an intermediate cladding is inserted between an outer cladding and an inner cladding in order to better confine the signal light in the core of the triple clad fiber, may also be implemented to better confine the pump power in a suitable pumping region of the fiber. For example, it would be advantageous to limit the pump power that interacts with the outer cladding, in order to avoid deterioration of the outer cladding. The outer cladding is often made of a low-index polymer that cannot stand the same power density than glass. By inserting one or several additional claddings or layers between the intermediate cladding and the outer cladding, it is possible to confine different portions of the pump power density as a function of different cross-sectional regions of the fiber and in particular, limit the power density that interacts with the outer cladding (which in fact acts as a boundary layer to the pump power propagation).

This gives rise to a multi-clad fiber that can contain four or more cladding layers, the indices of refraction of which have been chosen to provide a desired pump power density distribution across the fiber.

Figure 3:
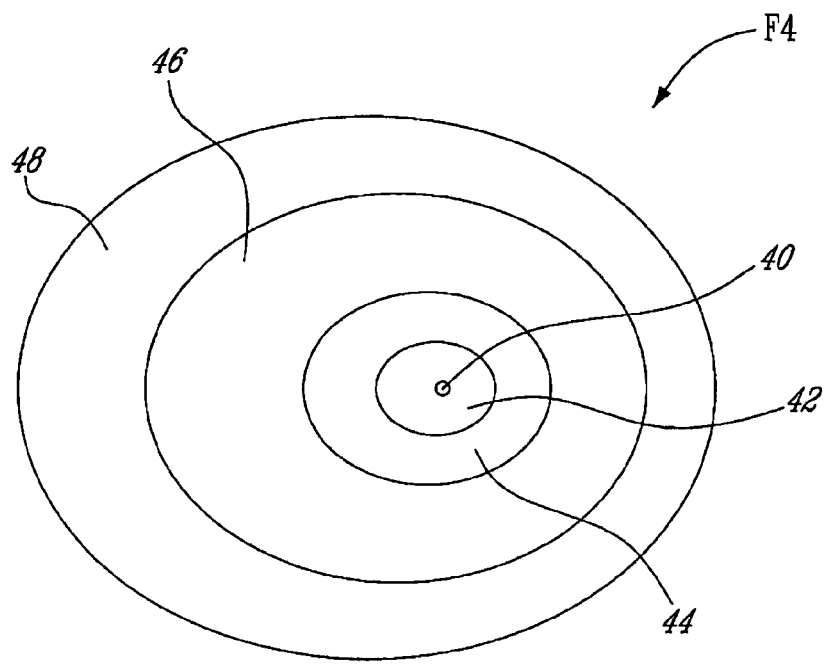
FIG. 3 is a schematic cross-sectional representation of a quadruple-clad rare-earth doped fiber in accordance with another embodiment of the present invention.

FIG. 3 is an example of a multi-clad fiber, here a quadruple-clad fiber F4. In one possible embodiment, the quadruple-clad fiber F4 provides an amplification region (the core) 40, a $1^{st}$ doped silica clad 42 disposed around the core 40, a $2^{nd}$ undoped silica clad 44 disposed around the $1^{st}$ clad 42, a $3^{rd}$ doped silica clad 46 disposed around the $2^{nd}$ silica clad 44, and a $4^{th}$ low index polymer clad 48 (or other material) disposed around the $3^{rd}$ silica clad 46 for guiding the pump power.

Figure 4:
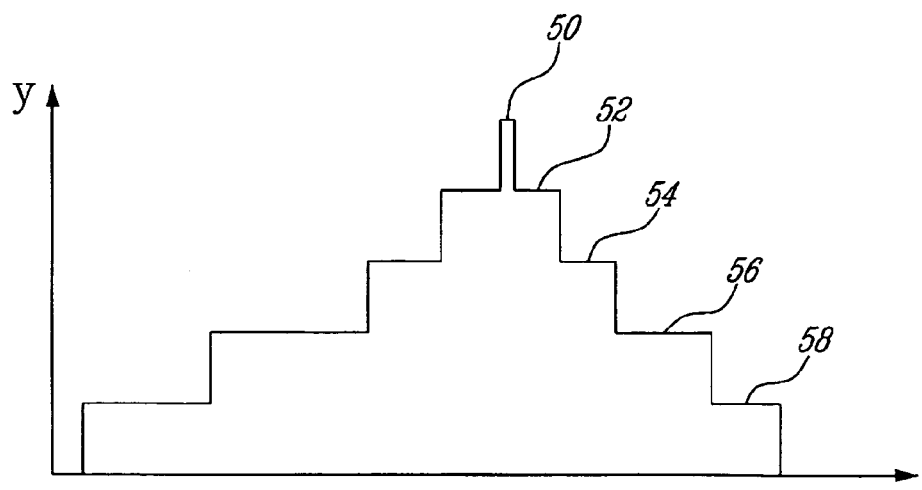
FIG. 4 is a schematic graphic representation of the refractive index profile of the various sections of the fiber of FIG. 3.

FIG. 4 presents a graph of the refractive indexes of the various sections of the fiber F4. More particularly, the refractive indexes of the core 40 and the first, second, third and fourth claddings 42, 44, 46 and 48, respectively, are respectively indicated at 50, 52, 54, 56 and 58. On the graphic representation of FIG. 4, the y-axis corresponds to relative refractive indexes of the different sections of the optical fiber F4, whereas the x-axis corresponds to an arbitrary value relating to the diameter of the optical fiber F4, that is the fiber cross-section or diameter, which is measured in a unit of length, generally in micrometers. As illustrated in FIG. 4, the $1^{st}$ clad 42 has a refractive index 52 lower than a refractive index 50 of the core 40 and higher than a refractive index 54 of the $2^{nd}$ clad 44 allowing for a low numerical aperture of the core 40, the $3^{rd}$ clad 46 has a refractive index 56 lower than the refractive index 54 of the $2^{nd}$ clad 44 but higher than the refractive index 58 of the $4^{th}$ clad 48, allowing the high pump power to be confined inside a volume limited by the outer boundary of the $3^{rd}$ clad 46. This configuration also allows the high pump power to be injected inside a larger numerical aperture. The added $3^{rd}$ glass cladding 46 waveguide allows the guidance of some of the high pump power inside a volume limited by the outer boundary of the second cladding 44, reducing the pump power to be interacting with the $4^{th}$ clad 48 made out of a low index polymer.

This invention is not limited to four clad layers and covers any geometry where a multi-clad design will improve the guiding properties in terms of maximum pump power, background losses and bending losses.

The geometry of each cladding will also favor the pump power mode mixing. The glass cladding geometries proposed (but not limited to) are the "D" shaped cross section and the convex polygonal cross section.

Such a fiber could also be polarization maintaining using any one of an elliptical core, an elliptical clad, a PANDA or Bow-Tie configuration.

As it will be apparent for someone skilled in the art, the present invention comprises not only rear-earth doped fibers but includes also any type of fibers, doped or un-doped. Furthermore, the present invention not only covers uniformly doped fibers but also covers doped fibers with cores that have been doped not-uniformly in order to provide a distributed doping profile across the core.

Although the present invention has been described hereinabove by way of specific embodiments thereof, it can be modified, without departing from the spirit and nature of the subject invention as defined herein. The scope of the invention is therefore intended to be limited solely by the scope of the appended claims.

We claim:

1. A triple-clad optical fiber for high power cladding-pumped fiber amplifiers and lasers, the triple-clad fiber comprising the following elements:

a core doped to provide an amplification region;
an inner cladding disposed around said core;
an intermediate cladding disposed around said inner cladding and larger than said inner cladding for guiding pump power; and
an outer cladding disposed around said intermediate cladding,
and wherein:
said inner cladding has a refractive index lower than a refractive index of said core and higher than a refractive index of said intermediate cladding allowing for a low numerical aperture of said core, and
said outer cladding has a refractive index lower than the refractive index of said intermediate cladding allowing said pump power to be confined inside a volume limited by said outer cladding.

2. An optical fiber as defined in claim 1, wherein said core is doped with rare-earth elements and represents the waveguide section of higher refractive index through which a signal is transmitted and amplified.

3. An optical fiber as defined in claim 1, wherein a fiber coating is provided around said outer cladding.

4. An optical fiber as defined in claim 1, wherein said inner cladding is within said intermediate, larger, cladding which is made of glass, that is used to guide multimode, high-power pump, said inner cladding acting as an intermediate level between said core and said multi-mode pump guiding intermediate cladding, with said outer cladding being present in said optical fiber for allowing said intermediate cladding to guide the pump power properly.

5. An optical fiber as defined in claim 1, wherein said outer cladding is made of glass or of a low-index polymer material.

6. An optical fiber as defined in claim 1, wherein said inner cladding is adapted to trap some of a pump signal into a smaller section in order to accelerate an absorption of a pump power.

7. An optical fiber as defined in claim 1, wherein said core is centered in said optical fiber.

8. An optical fiber as defined in claim 1, wherein said inner cladding is asymmetrically positioned in relation to the fiber center in order to provide pump power mode mixing.

9. An optical fiber as defined in claim 1, wherein said intermediate cladding has a convex polygonal cross-section.

10. An optical fiber as defined in claim 1, wherein any of said core or said inner, intermediate and outer claddings is made to be polarization-maintaining using any of one an elliptical core, an elliptical clad, a panda or bow-tie configuration, and a D-shaped section.

11. An optical fiber as defined in claim 1, wherein the triple-clad configuration of said optical fiber is adapted to allow multimode high-power pumping of a signal to be amplified while optimizing the overlap between the pump and signal, thus optimizing the power conversion efficiency between the pump and signal, in order to make efficient optical amplifiers or lasers.

12. A multi-clad optical fiber, the fiber comprising:
a core doped to provide an amplification region;
an inner cladding disposed around said core;
an intermediate multi-layer cladding structure having at least two layers, disposed around the inner cladding, for distributing a pump power between said layers, said inner cladding and said core, wherein the multi-layer structure comprises at least an inner layer, disposed directly around the inner cladding and an outer layer disposed at an outer boundary of the structure;
an outer cladding disposed around the outer layer of the intermediate multi-layer cladding structure;
and wherein:
the inner cladding has a refractive index lower than a refractive index of the core and higher than a refractive index of the inner layer of the intermediate cladding structure, allowing for a low numerical aperture of the core, and
the outer cladding has a refractive index lower than a refractive index of the outer layer of the intermediate multi-layer cladding structure, allowing said pump power to be confined inside a volume limited by said outer cladding.

13. The multi-clad fiber of claim 12, wherein the inner layer of the intermediate multi-layer cladding structure has a refractive index higher than the refractive index of the outer layer of the intermediate multi-layer cladding structure, whereby an important portion of the pump power is confined inside a volume limited by the outer layer.

14. The multi-clad fiber of claim 12, wherein the intermediate cladding structure comprises only said inner and outer layers, to provide a quadruple-clad fiber.

* * * * *

UNITED STATES PATENT AND TRADEMARK OFFICE
CERTIFICATE OF CORRECTION

PATENT NO. : 7,068,900 B2 Page 1 of 1
APPLICATION NO. : 11/088946
DATED : June 27, 2006
INVENTOR(S) : André Croteau et al.

It is certified that error appears in the above-identified patent and that said Letters Patent is hereby corrected as shown below:

On the title page:

Item: (73) Assignee: insert the following name and address of assignee: INSTITUT NATIONAL D'OPTIQUE, Quebec, Canada Signed and Sealed this Fourth Day of December, 2007

JON W. DUDAS
*Director of the United States Patent and Trademark Office*